United States Patent
Kim

(10) Patent No.: US 9,671,240 B2
(45) Date of Patent: Jun. 6, 2017

(54) ROUTE SEARCHING METHOD OF NAVIGATION SYSTEM AND APPARATUS THEREFOR

(71) Applicant: Hyundai Motor Company, Seoul (KR)

(72) Inventor: Chi Hwan Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 240 days.

(21) Appl. No.: 14/320,925

(22) Filed: Jul. 1, 2014

(65) Prior Publication Data

US 2015/0153189 A1 Jun. 4, 2015

(30) Foreign Application Priority Data

Dec. 3, 2013 (KR) ........................ 10-2013-0149056

(51) Int. Cl.
*G01C 21/34* (2006.01)

(52) U.S. Cl.
CPC ................................. *G01C 21/3453* (2013.01)

(58) Field of Classification Search
CPC ............ G01C 21/3453; G01C 21/3461; G01C 21/3446
See application file for complete search history.

(56) References Cited

U.S. PATENT DOCUMENTS

| | | | |
|---|---|---|---|
| 5,938,720 A * | 8/1999 | Tamai | G01C 21/3446 701/411 |
| 7,058,016 B1 * | 6/2006 | Harper | H04L 45/00 370/238 |
| 7,269,505 B2 | 9/2007 | Zhao et al. | |
| 8,150,611 B2 | 4/2012 | Mukherjee | |
| 8,180,518 B2 | 5/2012 | Petricoin, Jr. | |
| 8,188,887 B2 | 5/2012 | Catten | |
| 2004/0215389 A1 * | 10/2004 | Hirose | G01C 21/3461 701/410 |
| 2005/0065711 A1 | 3/2005 | Dahlgren et al. | |
| 2005/0256638 A1 * | 11/2005 | Takahashi | G01C 21/3484 701/431 |
| 2005/0261831 A1 * | 11/2005 | Irie | G01C 21/36 701/443 |
| 2006/0116818 A1 * | 6/2006 | Chao | G01C 21/3415 701/431 |
| 2006/0224303 A1 * | 10/2006 | Hayashi | G01C 21/3629 701/431 |

(Continued)

FOREIGN PATENT DOCUMENTS

| | | |
|---|---|---|
| JP | 2004-205409 A | 7/2004 |
| JP | 2004-286559 A | 10/2004 |
| KR | 10-2012-0010024 A | 2/2012 |

*Primary Examiner* — Jerrah Edwards
*Assistant Examiner* — Kelly D Williams
(74) *Attorney, Agent, or Firm* — Mintz Levin Cohn Ferris Glovsky and Popeo, P.C.; Peter F. Corless

(57) ABSTRACT

A route searching method of a navigation system is provided and includes calculating, by a processor, a turning cost from an i-th node to an (i+1)-th node and a turning cost from the (i+1)-th node to an (i+2)-th node. The processor determines whether the turning costs are different between the sets of nodes. In addition, the processor calculates a driving risk degree from the i-th node to the (i+1)-th node when the turning direction from the i-th node to the (i+1)-th node is different from the turning direction from the (i+1)-th node to the (i+2)-th node.

10 Claims, 6 Drawing Sheets

(56) References Cited

U.S. PATENT DOCUMENTS

| | | | |
|---|---|---|---|
| 2007/0050133 A1* | 3/2007 | Yoshikawa | G01C 21/3658 701/437 |
| 2007/0225900 A1* | 9/2007 | Kropp | G01C 21/3697 701/418 |
| 2008/0094250 A1 | 4/2008 | Myr | |
| 2013/0006508 A1* | 1/2013 | Li | G01C 21/26 701/117 |
| 2013/0253809 A1* | 9/2013 | Jones | G08G 1/0112 701/117 |

\* cited by examiner

ROUTE SEARCHING METHOD OF NAVIGATION SYSTEM AND APPARATUS THEREFOR

CROSS-REFERENCE TO RELATED APPLICATION

This application claims under 35 U.S.C. §119(a) the benefit of Korean Patent Application No. 10-2013-0149056 filed Dec. 3, 2013, the entire contents of which are incorporated herein by reference.

BACKGROUND (a) Technical Field

The present invention relates to a route searching method of a navigation system. More particularly, the present invention relates to a route searching method of a navigation system, which provides a safer route by avoiding a dangerous route.

(b) Background Art

A navigation system is a system that displays a current position of a moving object, such as a vehicle, on a screen (e.g., a display screen), using information received from a global positioning system (GPS). The navigation system is incorporated in a variety of moving objects such as vessels, aircraft and vehicles to identify the current position and moving speed of a moving object or determine a movement route of the moving object.

For navigation systems applied to a vehicle driving on a road, the navigation system visually and audibly provides various types of information such as a current driving road and a current position. In addition, the navigation system provides a driver with various types of information used for driving by displaying an advancing direction of the vehicle, a distance to a desired destination, a current moving speed, a route set by the driver before driving the vehicle, a final route to the destination, and the like. However, the route searching method of the navigation system generally guides a path toward a destination by reflecting the shortest path.

FIG. 1 is an exemplary view illustrating a route searching method of a conventional navigation system. When a driver selects an arrival point as a destination in the conventional navigation system within a vehicle, the conventional navigation system guides a route as shown in arrow of FIG. 1. That is, the conventional navigation system guides a route using a shortest route. However, the route generates a situation in which the vehicle may have to cross a five-lane road through a short route to move from a start point to the destination. When the vehicle moves across a substantial number of lanes at a time, the risk of a car accident may increase. Therefore, to reduce the risk of a car accident, the driver should be guided to another route that avoids the dangerous path when the shortest path is determined to be unsafe.

FIG. 2 is an exemplary view illustrating the route searching method of the conventional navigation system, which briefly represents the situation of FIG. 1, using nodes. The conventional navigation system considers only whether first to third nodes are sequentially connected in the movement of the first to third nodes, and does not decide whether the drive from the second node to the third node is possible. However, whether the drive from the second node to the third node is dangerous and whether the drive from the second node to the third node is possible are actually determined by whether the vehicle drives to the first node in direction A or B. In other words, when the vehicle is driven to the first node in the A direction, the movement from the second node to the third node is determined to be safe. However, when the vehicle is driven to the first node in the B direction, the movement from the second node to the third node is determined to be dangerous (e.g., unsafe) since the vehicle must immediately turn right and left. The conventional navigation system simply connects links between nodes on a shortest route. Accordingly, the conventional navigation system does not avoid a route having a high risk of an accident despite the route being a shortest route.

SUMMARY

The present invention provides a route searching method of a navigation system, which may avoid a dangerous route by considering a driving possibility. The present invention also provides a route searching method of a navigation system, which may actively adjust a reference value of a dangerous route by determining whether a driver is driving to a route provided from the navigation system.

In one aspect, the present invention provides a route searching method of a navigation system that may include: calculating, by a processor, a turning cost from an i-th node to an (i+1)-th node; calculating, by the processor, a turning cost from the (i+1)-th node to an (i+2)-th node; determining, by the processor, whether the turning cost from the i-th node to the (i+1)-th node is different from the turning cost from the (i+1)-th node to the (i+2)-th node; determining, by the processor, whether the turning direction from the i-th node to the (i+1)-th node is different from the turning direction from the (i+1)-th node to the (i+2)-th node when the turning cost from the i-th node to the (i+1)-th node is different from the turning cost from the (i+1)-th node to the (i+2)-th node; and calculating, by the processor, a driving risk degree from the i-th node to the (i+1)-th node when the turning direction from the i-th node to the (i+1)-th node is different from the turning direction from the (i+1)-th node to the (i+2)-th node.

In an exemplary embodiment, the route searching method may further include: after calculating the driving risk degree from the i-th node to the (i+1)-th node when the turning direction from the i-th node to the (i+1)-th node is different from the turning direction from the (i+1)-th node to the (i+2)-th node, re-calculating, by the processor, the turning cost from the i-th node to the (i+1)-th node after 1 is added to i. In addition, the route searching method may further include: after the calculating the driving risk degree from the i-th node to the (i+1)-th node when the turning direction from the i-th node to the (i+1)-th node is different from the turning direction from the (i+1)-th node to the (i+2)-th node, excluding, by the processor, the route from the (i+1)-th node to the (i+2)-th node from route searching when the driving risk degree from the i-th node to the (i+1)-th node is greater than a predetermined reference value.

In another exemplary embodiment, the route searching method may further include: after the excluding the route from the (i+1)-th node to the (i+2)-th node from the route searching when the driving risk degree from the i-th node to the (i+1)-th node is greater than the predetermined reference value, storing, by the processor, the route from the (i+1)-th node to the (i+2)-th node; determining, by the processor, whether a vehicle is being driven to the route from the (i+1)-th node to the (i+2)-th node; and adjusting, by the processor, the predetermined reference value to increase when the vehicle is driven to the route from the (i+1)-th node to the (i+2)-th node.

Further, the route searching method may include: after the calculating the driving risk degree from the i-th node to the (i+1)-th node when the turning direction from the i-th node to the (i+1)-th node is different from the turning direction from the (i+1)-th node to the (i+2)-th node, storing, by the processor, the route from the (i+1)-th node to the (i+2)-th node when the driving risk degree from the i-th node to the (i+1)-th node is less than the predetermined reference value; determining, by the processor, whether the vehicle is being driven to the route from the (i+1)-th node to the (i+2)-th node; and adjusting, by the processor, the predetermined reference value to decrease when the vehicle is not being driven to the route from the (i+1)-th node to the (i+2)-th node.

The driving risk degree may be calculated by multiplying the number of lanes between the (i+1)-th and (i+2)-th nodes by a road speed limit or road grade and dividing the distance between the (i+1)-th and (i+2)-th nodes into the multiplied value. The number of lanes may be the number of lanes on an actual road or the number of lanes required to move (e.g., the number of lanes to drive across to reach the next point on the route). In addition, a weight value may be applied to the number of lanes, the road speed limit, the road grade or the distance.

In another aspect, the present invention provides a route searching apparatus of a navigation system that may include: a node production unit configured to produce nodes on a route between a starting point and a destination of a vehicle; a turning cost calculation unit configured to calculate turning costs between the nodes produced by the node production unit; a turning direction calculation unit configured to calculate turning directions between nodes produced by the node production unit; a driving risk degree calculation unit configured to calculate a driving risk degree, using the turning directions calculated by the turning direction calculation unit and the turning costs calculated by the turning cost calculation unit; a comparison unit configured to compare whether the driving risk degree calculated by the driving risk degree calculation unit is greater than or less than a predetermined reference value; and a dangerous node deletion unit configured to determine nodes to be excluded from the nodes between the route between the starting point and the destination of the vehicle, based on the value compared by the comparison unit. The above plurality of units may be executed by a processor.

The predetermined reference value of a route between the excluded nodes may be increased when the vehicle is driven to the route between the corresponding nodes when the driving risk degree is greater than the predetermined reference value by comparing an actual driving rout of the vehicle with a route provided from the navigation system. Additionally, the predetermined reference value of a route between the nodes except the excluded nodes may be decreased even though the driving risk degree is greater than the predetermined reference value.

As described above, the route searching apparatus according to the present invention have advantages as follows.

First, the route searching apparatus may be configured to guide a driver to avoid a dangerous route such as a route where the driver is required to pass through a substantial number of lanes at a time (e.g., above a predetermined number of lanes) or where the driver is required to turn to the left and then immediately turn to the right or turn to the right and then immediately turn to the left, thereby improving driver's safety.

Second, the route searching apparatus may be configured to guide a driver to routes except a route where the driver has difficulty in driving from the time when route guidance is started, to prevent the driver from selecting a roundabout way as the driver does not drive to the corresponding route. Accordingly, it may be possible to provide the driver with a faster and safer route.

Third, the reference value of a dangerous route may be actively adjusted according to a driver's propensity, to provide each driver with an optimized fast and safe route.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
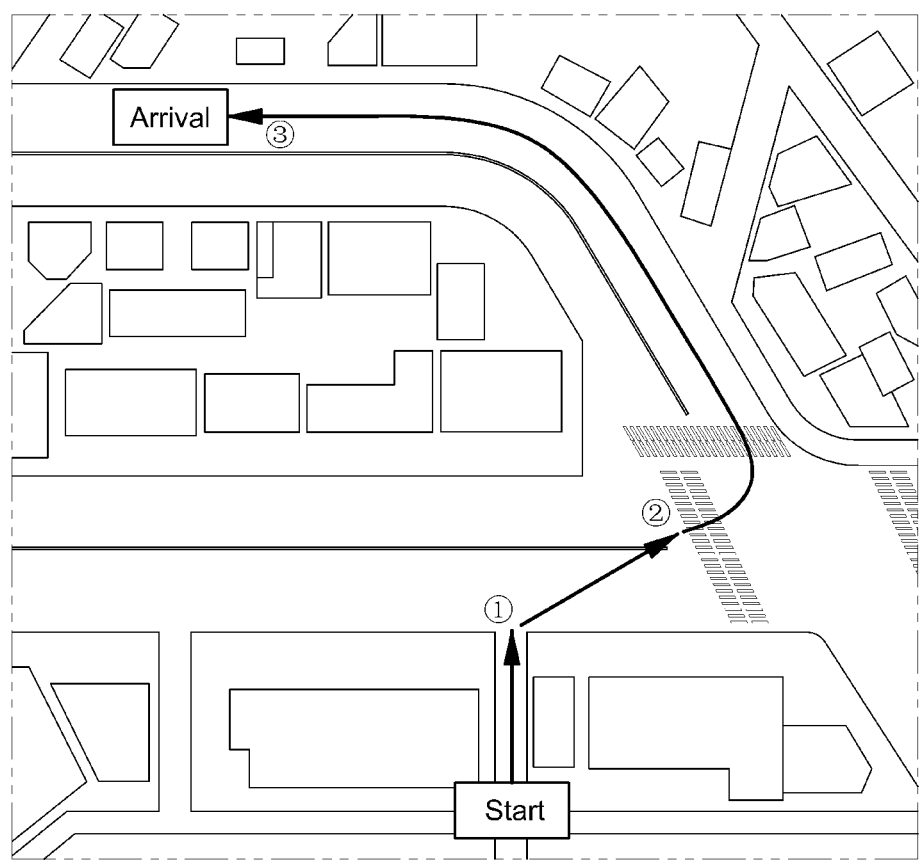
FIG. 1 is an exemplary view illustrating a route searching method of a conventional navigation system according to the related art.
Figure 2:
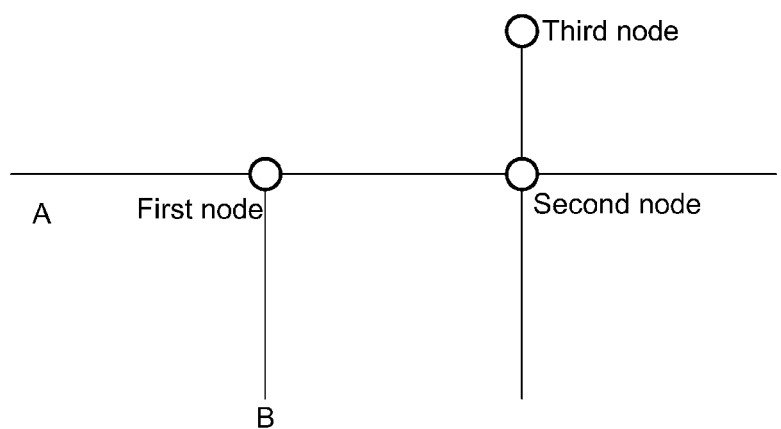
FIG. 2 is an exemplary view illustrating the route searching method of the conventional navigation system, which briefly represents the situation of FIG. 1, using nodes according to the related art.

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g., fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the accompanying claims.

Figure 3:
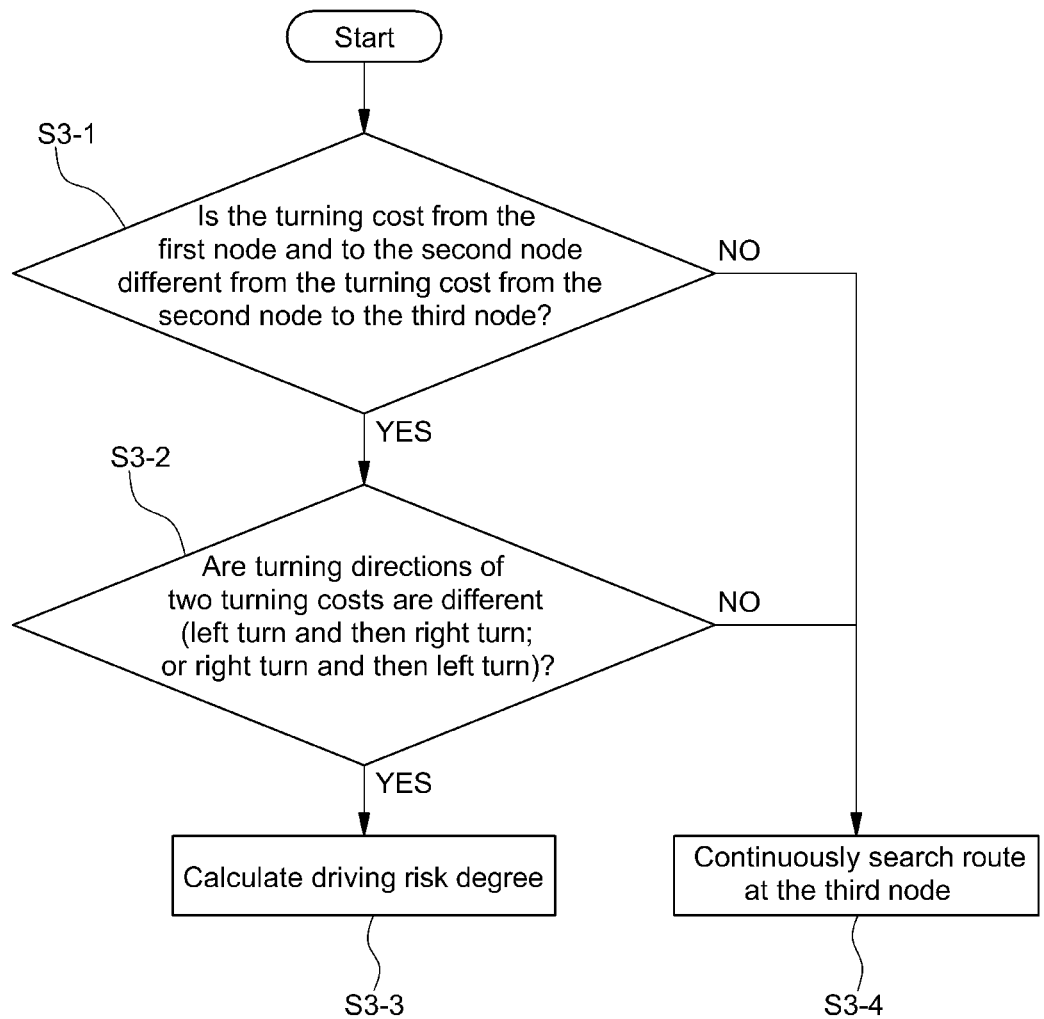
FIG. 3 is an exemplary flowchart schematically illustrating a route searching method of a navigation system according to an exemplary embodiment of the present invention.

FIG. 3 is an exemplary flowchart schematically illustrating a route searching method of a navigation system according to an exemplary embodiment of the present invention. In the route searching method of the navigation system, although the risk degrees of nodes on the route from a starting point to a destination may be sequentially decided, a virtual driving situation from a first node to a third node will be assumed hereinbelow. However, the terms 'first to third nodes' are represented to distinguish any one node from another node, but it does not means that the first node is a starting point and the third node is a destination.

Once the route searching method is started, the route searching method may perform a process of determining whether the turning cost between the first and second nodes and the turning cost between the second and third nodes are different from each other (S3-1). In particular, the turning cost refers to a cost required to move between nodes. The turning cost may be determined by considering a distance between nodes, the number of lanes, a speed limit, a turning direction, or the like. However, the present invention is not limited thereto, and any factor may be selected as long as used to appropriately calculate a cost required to move between nodes.

For example, the turning cost may be simply determined through a distance between nodes. In other words, when the distance between the first and second nodes and the distance between the second and third nodes are different from each other, the turning costs may be determined to be different from each other. When the different between the distances is a predetermined reference value or greater, the process may be configured to determine that the turning cost between the first and second nodes and the turning cost between the second and third nodes are different from each other.

When the turning cost between the first and second nodes and the turning cost between the second and third nodes are about equal to each other, the route searching method may perform a process of determining whether turning costs between subsequent nodes are different. In other words, the processor may be configured to continuously search the route at the third node as a next node (S3-4).

When the turning cost between the first and second nodes and the turning cost between the second and third nodes are different from each other, the route searching method may perform a process of determining whether the turning directions of the two turning costs are different from each other. In other words, when assuming that a vehicle turns to the left while moving from the first node to the second node, the processor may be configured to determine that the turning directions are different when the vehicle turns to the right while moving from the second node to the third node. Similarly, when assuming that the vehicle turns to the right while moving from the first node to the second node, the processor may be configured to determine that the turning directions are different when the vehicle turns to the left while moving from the second node to the third node.

The processor may be configured to determine whether the turning directions are different because when the driving risk degrees of substantially all nodes on the route from a starting point to a destination are calculated, the navigation system may be unable to process all the information at a desired speed and a searching speed may decrease. When the turning directions are different such as a right turn after a left turn or a left turn after a right turn, this may be a particularly dangerous situation. Accordingly, a calculation amount may be reduced by detecting such a dangerous situation between nodes.

Further, in response to determining that the turning directions are about equal to each other, the processor may be configured to again continuously search the route at the third node as a next node (S3-4). However, when the turning direction between the first and second nodes and the turning direction between the second and third nodes are different from each other, the processor may be configured to calculate a driving risk degree (S3-3).

In the route searching method according to the exemplary embodiment of the present invention, the above processes may be initially performed one at a time, or may be performed while the navigation system is guiding the vehicle toward the destination. In addition, the first, second and third nodes may be respectively represented as an i-th node, an (i+1)-th node and an (i+2)-th node. Here, it may be an integer of 0 or greater. When the first, second and third nodes are respectively represented as an i-th node, an (i+1)-th node and an (i+2)-th node, the processes may be performed as follows.

First, the processor may be configured to calculate a turning cost from the i-th node to the (i+1)-th node and then calculate a turning cost from the (i+1)-th node to the (i+2)-th node. The processor may then be configured to determine whether the turning cost from the i-th node to the (i+1)-th node and the turning cost from the (i+1)-th node to the (i+2)-th node are different from each other. When the turning directions of the two turning costs are different from each other, the processor may be configured to calculate a driving risk degree.

The method of representing nodes using the first, second and third nodes is not different from the method of representing nodes using the i-th, (i+1)-th and (i+2)-th nodes. However, the route searching method according to the exemplary embodiment of the present invention may be performed using variable 'i' even when nodes include the third node or more. The driving risk degree may be extracted through link information between the second and third nodes. The driving risk degree may also be extracted through the number of lanes, a road grade, a speed limit, a link length, etc., which may be required to move between the second and third nodes. In particular, the link length may mean a distance between the second and third nodes. For example, the driving risk degree may be calculated using the following equation.

$$\text{Driving risk degree} = \frac{(\text{number of lanes} \times a) \times (\text{road speed limit} \times b)}{\text{link length} \times c} \quad \text{Equation 1}$$

In Equation 1, the number of lanes may be the number of lanes on a current road or the number of lanes required to move toward a next point along the route. In addition, a, b and c may be weight values reflected in the number of lanes used to calculate the driving risk degree, the road speed limit and the link length. Further, the influence of each factor in the calculation of the driving risk degree may be actively controlled by adjusting these weight values. The driving risk degree of the first node may be determined by the number of lanes between the second and third nodes, the road speed limit between the second and third nodes, the link length between the second and third nodes, and the like. In other words, the driving risk degree of the first node may increase as the number of lanes increases while moving from the second node to the third node. The driving risk degree of the first node may increase as the road speed limit increases while moving from the second node to the third node. In addition, the driving risk degree of the first node may increase as the link length decreases while moving from the second node to the third node.

Figure 4:
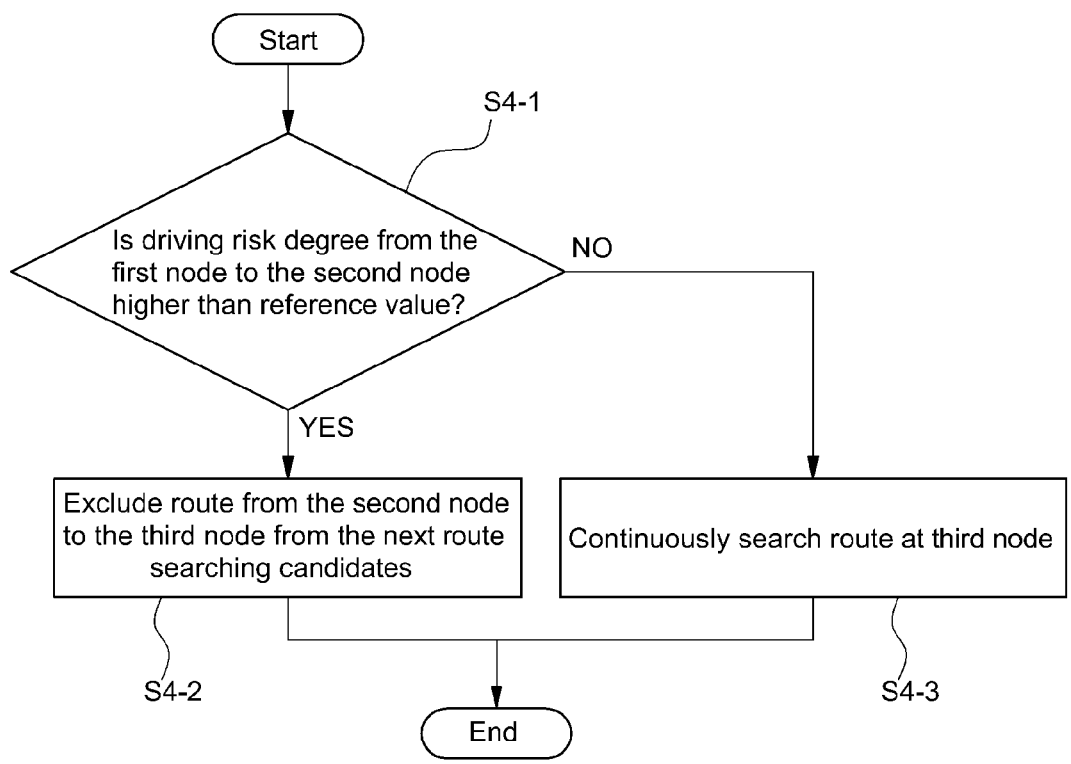
FIG. 4 is an exemplary flowchart illustrating the route searching method according to driving risk degrees from a first node to a third node according to an exemplary embodiment of the present invention.

FIG. 4 is an exemplary flowchart illustrating the route searching method according to driving risk degrees from the first node to the third node. First, the route searching method may include calculating, by the processor, a driving risk degree from the first node to the second node and determining whether the calculated driving risk degree is greater than a predetermined reference value (S4-1).

In particular, when the driving risk degree is greater than the predetermined reference value, the processor may be configured to exclude the route from the second node to the third node from next route searching candidates (S4-2). In other words, when the driving risk degree is greater than reference value when the vehicle turns to the left and then immediately turns to the right or when the vehicle turns to the right and then immediately turns to the left on a current route, the route may be excluded from next searching routes. However, when the driving risk degree from the first node to the second node is less than the predetermined reference value, the route may be a route determined to be safe. Therefore, the processor may again be configured to continuously search the route at the third node (S4-3).

Moreover, the first, second and third nodes may be respectively represented as an i-th node, an (i+1)-th node and an (i+2)-th node. In particular, the processor may be configured to determine whether the driving risk degree from the i-th node to the (i+1)-th node is greater than the predetermined reference value. When the driving risk degree from the i-th node to the (i+1)-th node is greater than the predetermined reference value, the route from the (i+1)-th node to the (i+2)-th may be deleted (e.g., omitted from the route). When the driving risk degree from the i-th node to the (i+1)-th node is less than the predetermined reference value, the searching the route at the (i+2)-th node may be continuously performed.

Figure 5:
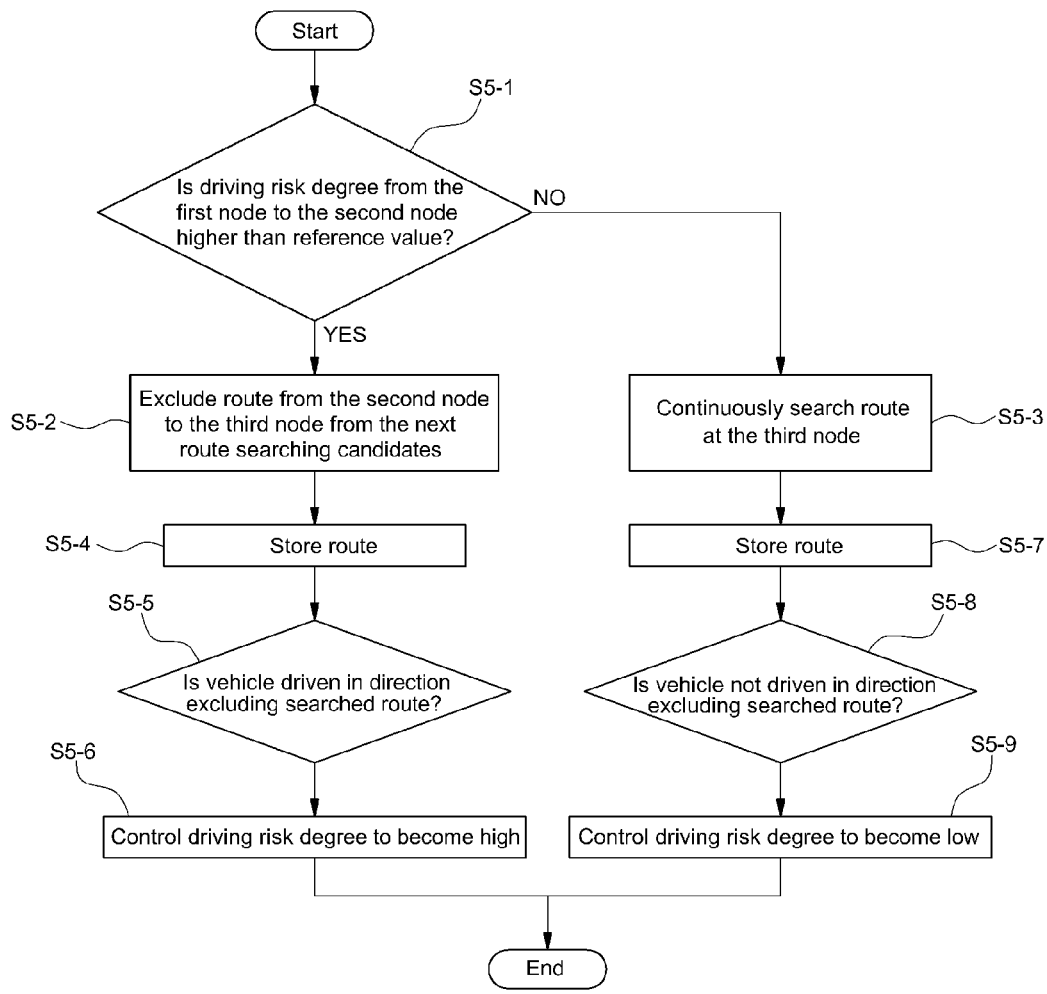
FIG. 5 is an exemplary flowchart illustrating the route searching method according to the driving risk degrees according to an exemplary embodiment of the present invention.

FIG. 5 is an exemplary flowchart illustrating the route searching method according to the driving risk degrees according to the exemplary embodiment of the present invention. The exemplary embodiment of FIG. 5 is different from the embodiment of FIG. 4 in that the routes between nodes are not simply searched according to driving risk degrees, but a route to be deleted may be determined by reflecting whether the vehicle is actually being driven.

First, the processor may be configured to determine whether the driving risk degree from the first node to the second node is greater than the predetermined reference value (S5-1). When the driving risk degree is greater than the predetermined reference value, the processor may be configured to exclude the route from the second node to the third node from next route searching candidates (S5-2).

Subsequently, the processor may be configured to store the route from the second node to the third node (S5-3) in a memory. Thus, the route searching method may not guide the route from the second node to the third node while guiding a driver to the route toward the destination. However, the driver may actually drive the vehicle, using the route from the second node to the third node. Accordingly, the driver may sufficiently drive the vehicle through the route. In addition, although the route may be a route considered to be dangerous (e.g., unsafe), the driver may actually drive the vehicle through the route. Thus, the processor may be configured to determine whether the vehicle is driven through the route from the second node to the third node (S5-5).

When the vehicle is driven through the route from the second node to the third node, it may be less likely that the route from the second node to the third node will be deleted. Therefore, the processor may be configured to increase the driving risk degree as the predetermined reference value (S5-6). In other words, the calculated driving risk degree between the first and second nodes may be less than the predetermined reference value, and thus, the route from the second node to the third node may be provided in a subsequent process.

When the driving risk degree from the first node to the second node is less than the reference value, the processor may be configured to continuously search the route at the third node (S5-3). In response to determining that the driving risk degree from the first node to the second node is less than the reference value, the processor may be configured to store the route between the second and third nodes (S5-4) in a memory. The corresponding route may be stored to guide the route from the starting point toward the destination and to determine whether the vehicle is actually driven through the corresponding route.

In addition, the may be configured to determine whether the driver does not drive the vehicle through the route (S5-8). When the driver is not driving the vehicle through the corresponding route even though the driver is being guided to the corresponding route, the corresponding route may be an actually dangerous route, unlike the driving risk degree calculated with respect to the corresponding route. Thus, the processor may be configured to decrease the predetermined reference value as the driving risk degree (S5-9). The corresponding route may be deleted from next route searching candidates by decreasing the predetermined reference value and then comparing the driving risk degree calculated in a subsequent process with the controlled reference value.

As described above, for convenience of illustration, the first, second and third nodes may be respectively represented as an i-th node, an (i+1)-th node and an (i+2)-th node. In particular, after the process of calculate a driving risk degree between the i-th and (i+1)-th nodes and determining whether the calculated driving risk degree is greater than the predetermined reference value, the processor may be configured to determine whether the route between the (i+1)-th and (i+2)-th nodes is provided. In addition, the processor may be configured to store the route between the (i+1)-th and (i+2)-th nodes and adjust the predetermined reference value (e.g., increase or decrease the predetermined reference value) by determining whether the vehicle is driven through the stored route.

Figure 6:
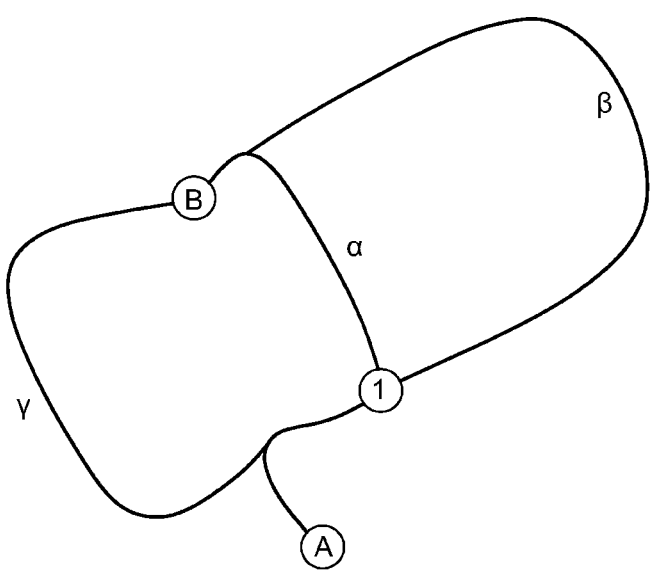
FIG. 6 is an exemplary view illustrating a route provided according to the route searching method of FIG. 5 according an exemplary embodiment of the present invention.

FIG. 6 is an exemplary view illustrating a route provided according to the route searching method of FIG. 5 according to an exemplary embodiment of the present invention. First, it may be assumed that when the route from point 'A' to point 'B' is searched, the route searching method according to the exemplary embodiment of the present invention guides route 'α'.

When a driver driving a vehicle does not drive to the route 'α' by turning to the left at node '1', the route 'α' may be determined to be a dangerous route. Thus, the processor may be configured to decrease a reference value as a driving risk degree of the route 'α'. Then, the driver may arrive at the point 'B' using route 'β'.

Subsequently, when the route from the point 'A' to the point 'B' is searched again, the processor may already have decreased the predetermined reference value of the route 'α'. Therefore, the driving risk degree calculated at the point 'A' may be greater than the predetermined reference value. In particular, the route 'α' may be deleted, and the route from the point 'A' to the point 'B' may be estimated again. Thus, the processor may be configured to provide the driver with route 'γ'.

The invention has been described in detail with reference to exemplary embodiments thereof. However, it will be appreciated by those skilled in the art that changes may be made in these embodiments without departing from the principles and spirit of the invention, the scope of which is defined in the accompanying claims and their equivalents.

What is claimed is:

1. A route searching method of a navigation system, comprising:
    calculating, by a processor, a turning cost from an i-th node to an (i+1)-th node among nodes within a route from a starting point to a destination for a vehicle;
    calculating, by the processor, a turning cost from the (i+1)-th node to an (i+2)-th node;
    determining, by the processor, whether the turning cost from the i-th node to the (i+1)-th node is different from the turning cost from the (i+1)-th node to the (i+2)-th node;
    determining, by the processor, whether the turning direction from the i-th node to the (i+1)-th node is different from the turning direction from the (i+1)-th node to the (i+2)-th node when the turning cost from the i-th node to the (i+1)-th node is different from the turning cost from the (i+1)-th node to the (i+2)-th node;
    calculating, by the processor, a driving risk degree from the i-th node to the (i+1)-th node when the turning direction from the i-th node to the (i+1)-th node is different from the turning direction from the (i+1)-th node to the (i+2)-th node;
    comparing, by the processor, whether the calculated driving risk degree is greater than or less than a predetermined reference value; and
    determining, by the processor, nodes to be excluded from the nodes within the route from the starting point to the destination for the vehicle, based on the comparison,
    wherein the predetermined reference value of the route between the excluded nodes is increased when the vehicle is driven toward the route between the excluded nodes by comparing an actual driving route of the vehicle with a route provided from the navigation system.

2. The route searching method of claim 1, further comprising, after calculating the driving risk degree from the i-th node to the (i+1)-th node when the turning direction from the i-th node to the (i+1)-th node is different from the turning direction from the (i+1)-th node to the (i+2)-th node, re-calculating, by the processor, the turning cost from the i-th node to the (i+1)-th node after 1 is added to i.

3. The route searching method of claim 2, further comprising, after the calculating the driving risk degree from the i-th node to the (i+1)-th node when the turning direction from the i-th node to the (i+1)-th node is different from the turning direction from the (i+1)-th node to the (i+2)-th node, excluding, by the processor, the route from the (i+1)-th node to the (i+2)-th node from route searching when the driving risk degree from the i-th node to the (i+1)-th node is greater than the predetermined reference value.

4. The route searching method of claim 3, further comprising: after the excluding the route from the (i+1)-th node to the (i+2)-th node from the route searching when the driving risk degree from the i-th node to the (i+1)-th node is greater than the predetermined reference value,
    storing, by the processor, the route from the (i+1)-th node to the (i+2)-th node in a memory;
    determining, by the processor, whether a vehicle is being driven toward the route from the (i+1)-th node to the (i+2)-th node; and
    increasing, by the processor, the predetermined reference value when the vehicle is being driven toward the route from the (i+1)-th node to the (i+2)-th node.

5. The route searching method of claim 1, further comprising: after the calculating the driving risk degree from the i-th node to the (i+1)-th node when the turning direction from the i-th node to the (i+1)-th node is different from the turning direction from the (i+1)-th node to the (i+2)-th node,
    storing, by the processor, the route from the (i+1)-th node to the (i+2)-th node in a memory when the driving risk degree from the i-th node to the (i+1)-th node is less than the predetermined reference value;

determining, by the processor, whether the vehicle is being driven toward the route from the (i+1)-th node to the (i+2)-th node; and decreasing, by the processor, the predetermined reference value when the vehicle is not being driven toward the route from the (i+1)-th node to the (i+2)-th node.

6. The route searching method of claim 1, wherein the driving risk degree is calculated by multiplying the number of lanes between the (i+1)-th and (i+2)-th nodes by a road speed limit or road grade and then dividing the distance between the (i+1)-th and (i+2)-th nodes into the multiplied value.

7. The route searching method of claim 6, wherein the number of lanes is the number of lanes on an actual road or the number of lanes required to move to a next point along the route.

8. The route searching method of claim 6, wherein a weight value is applied to the number of lanes, the road speed limit, the road grade, or the distance.

9. A route searching apparatus of a navigation system, comprising:

a memory configured to store program instructions; and a processor configured to execute the program instructions, the program instructions when executed configured to:

produce nodes on a route between a starting point and a destination of a vehicle;

calculate turning costs between the produced nodes produced;

calculate turning directions between the produced nodes;

calculate a driving risk degree, using the calculated turning directions and the calculated turning costs;

compare whether the calculated driving risk degree is greater than or less than a predetermined reference value; and determine nodes to be excluded from the nodes between the route between the starting point and the destination of the vehicle, based on the comparison, wherein, the predetermined reference value of the route between the excluded nodes is increased when the vehicle is driven toward the route between the corresponding nodes when the driving risk degree is greater than the predetermined reference value by comparing an actual driving route of the vehicle with a route provided from the navigation system, and wherein the predetermined reference value of a route between the nodes except the excluded nodes is decreased even though the driving risk degree is greater than the predetermined reference value.

10. A non-transitory computer readable medium containing program instructions executed by a processor, the computer readable medium comprising:

program instructions that produce nodes on a route between a starting point and a destination of a vehicle;

program instructions that calculate turning costs between the produced nodes produced;

program instructions that calculate turning directions between the produced nodes;

program instructions that calculate a driving risk degree, using the calculated turning directions and the calculated turning costs;

program instructions that compare whether the calculated driving risk degree is greater than or less than a predetermined reference value; and program instructions that determine nodes to be excluded from the nodes between the route between the starting point and the destination of the vehicle, based on the comparison, wherein, the predetermined reference value of the route between the excluded nodes is increased when the vehicle is driven toward the route between the corresponding nodes when the driving risk degree is greater than the predetermined reference value by comparing an actual driving route of the vehicle with a route provided from the navigation system, and wherein the predetermined reference value of a route between the nodes except the excluded nodes is decreased even though the driving risk degree is greater than the predetermined reference value.

* * * * *